United States Patent [19]

Gilhousen et al.

[11] Patent Number: 5,109,390

[45] Date of Patent: Apr. 28, 1992

[54] DIVERSITY RECEIVER IN A CDMA CELLULAR TELEPHONE SYSTEM

[75] Inventors: Klein S. Gilhousen; Roberto Padovani, both of San Diego; Charles E. Wheatly, III, Del Mar, all of Calif.

[73] Assignee: Qualcomm Incorporated, San Diego, Calif.

[21] Appl. No.: 432,552

[22] Filed: Nov. 7, 1989

[51] Int. Cl.[5] .............................................. H04L 27/30
[52] U.S. Cl. .................................... 375/1; 375/40; 375/100; 455/10; 455/59; 455/68; 455/70; 455/33.2; 455/52.3; 455/56.1; 370/18
[58] Field of Search ............... 370/18, 50; 455/33, 455/54, 56, 59, 10, 52, 68, 70; 375/40, 100

[56] References Cited

U.S. PATENT DOCUMENTS

| | | | |
|---|---|---|---|
| 3,351,859 | 11/1967 | Groth, Jr. et al. | 375/1 |
| 4,112,257 | 9/1978 | Froms | 379/60 |
| 4,222,115 | 9/1980 | Cooper et al. | 375/1 |
| 4,291,410 | 9/1981 | Caples et al. | 375/1 |
| 4,630,283 | 12/1986 | Schiff | 375/1 |
| 4,669,091 | 5/1987 | Nossen | 375/14 |
| 4,672,658 | 6/1987 | Kavehrad et al. | 379/63 |
| 4,694,467 | 9/1987 | Mul | 375/1 |
| 4,710,944 | 12/1987 | Nossen | 375/40 |
| 4,736,460 | 4/1988 | Rilling | 455/283 |
| 4,752,969 | 6/1988 | Rilling | 455/278 |
| 4,765,753 | 8/1988 | Schmidt | 379/60 |
| 4,797,950 | 1/1989 | Rilling | 455/276 |

*Primary Examiner*—Bernarr E. Gregory
*Attorney, Agent, or Firm*—Russell B. Miller

[57] ABSTRACT

A spread spectrum receiver subsystem for utilization in a CDMA cellular telephone having a searcher receiver for scanning the time domain so as to use the PN processing gain and time discrimination properties of spread spectrum coding to determine the location in the time domain and the received signal strength of multiple receptions of a pilot signal traveling upon one or more physical propagation paths to reception. The searcher receiver provides a control signal indicative of the received pilot signals of greatest strength and corresponding time relationship. A data receiver receives spread spectrum communication signals accompanying each received pilot signal and is responsive to the searcher control signal for acquiring and demodulating a spread spectrum communication signal, concomitant with the pilot signal of greatest signal strength, and thus providing a corresponding information bearing encoded output signal.

18 Claims, 4 Drawing Sheets

DIVERSITY RECEIVER IN A CDMA CELLULAR TELEPHONE SYSTEM

BACKGROUND OF THE INVENTION

I. Field of the Invention

The present invention relates to cellular telephone systems. More specifically, the present invention relates to a novel and improved receiver design for enhancing the reliability and communications in the cellular telephone environment.

II. Description of the Related Art

The use of code division multiple access (CDMA) modulation techniques is one of several techniques for facilitating communications in which a large number of system users are present. Although other techniques such as time division multiple access (TDMA), frequency division multiple access (FDMA) and AM modulation schemes such as amplitude companded single sideband (ACSSB) are known, CDMA has significant advantages over these other techniques. The use of CDMA techniques in a multiple access communication system is disclosed in U.S. Patent application Ser. No. 06/921,261, filed Oct. 17, 1986, entitled "SPREAD SPECTRUM MULTIPLE ACCESS COMMUNICATION SYSTEM USING SATELLITE OR TERRESTRIAL REPEATERS", now U.S. Pat. No. 4,901,307 assigned to the assignee of the present invention, the disclosure thereof incorporated by reference.

In the just mentioned patent, a multiple access technique is disclosed where a large number of mobile telephone system users each having a transceiver communicate through satellite repeaters or terrestrial base stations (also known as cell-sites stations, or for short cell-sites) using code division multiple access (CDMA) spread spectrum communication signals. In using CDMA communications, the frequency spectrum can be reused multiple times thus permitting an increase in system user capacity. The use of CDMA results in a much higher spectral efficiency than can be achieved using other multiple access techniques. In a CDMA system, increases in system capacity may be realized by controlling the transmitter power of each mobile user so as to reduce interference to other system users.

In the satellite application of the CDMA communication techniques, the mobile unit transceiver measures the power level of a signal received via a satellite repeater. Using this power measurement, along with knowledge of the satellite transponder downlink transmit power level and the sensitivity of the mobile unit receiver, the mobile unit transceiver can estimate the path loss of the channel between the mobile unit and the satellite. The mobile unit transceiver then determines the appropriate transmitter power to be used for signal transmissions between the mobile unit and the satellite, taking into account the path loss measurement, the transmitted data rate and the satellite receiver sensitivity.

The signals transmitted by the mobile unit to the satellite are relayed by the satellite to a Hub control system earth station. The Hub measures the received signal power from signals transmitted by each active mobile unit transceiver. The Hub then determines the deviation in the received power level from that which is necessary to maintain the desired communications. Preferably the desired power level is a minimum power level necessary to maintain quality communications so as to result in a reduction in system interference.

The Hub then transmits a power control command signal to each mobile user so as to adjust or "fine tune" the transmit power of the mobile unit. This command signal is used by the mobile unit to change the transmit power level closer to a minimum level required to maintain the desired communications. As channel conditions change, typically due to motion of the mobile unit, both the mobile unit receiver power measurement and the power control feedback from the Hub continually readjust the transmit power level so as to maintain a proper power level. The power control feedback from the Hub is generally quite slow due to round trip delays through the satellite requiring approximately ½ of a second of propagation time.

One important difference between satellite or terrestrial base stations systems are the relative distances separating the mobile units and the satellite or cell-site. Another important different in the satellite versus the terrestrial system is the type of fading that occurs in these channels. Thus, these differences require various refinements in the approach to system power control for the terrestrial system.

In the satellite/mobile unit channel, i.e. the satellite channel, the satellite repeaters are normally located in a geosynchronous earth orbit. As such, the mobile units are all at approximately the same distance from the satellite repeaters and therefore experience nearly the same propagation loss. Furthermore, the satellite channel has a propagation loss characteristic that follows approximately the inverse square law, i.e. the propagation loss is inversely proportional to the square of the distance between the mobile unit and the satellite repeater in use. Accordingly, in the satellite channel the variation in path loss due to distance variation is typically on the order of only 1–2 dB.

In contrast to the satellite channel, the terrestrial/mobile unit channel, i.e. the terrestrial channel, the distance between the mobile units and the cell sites can vary considerably. For example, one mobile unit may be located at a distance of five miles from the cell site while another mobile unit may be located only a few feet away. The variation in distance may exceed a factor of one hundred to one. The terrestrial channel experiences a propagation loss characteristic as did the satellite channel. However, in the terrestrial channel the propagation loss characteristic corresponds to an inverse fourth-power law, i.e. the path loss is proportional to the inverse of the path distance raised to the fourth power. Accordingly, path loss variations may be encountered which are on the order of over 80 dB in a cell having a radius of five miles.

The satellite channel typically experiences fading that is characterized as Rician. Accordingly the received signal consists of a direct component summed with a multiply reflected component having Rayleigh fading statistics. The power ratio between the direct and reflected component is typically on the order of 6–10 dB, depending upon the characteristics of the mobile unit antenna and the environment about the mobile unit.

Contrasting the satellite channel with the terrestrial channel, the terrestrial channel experiences signal fading that typically consists of the Rayleigh faded component without a direct component. Thus, the terrestrial channel presents a more severe fading environment than the satellite channel where Rician fading is the dominant fading characteristic.

The Rayleigh fading characteristics in the terrestrial channel signal is caused by the signal being reflected from many different features of the physical environment. As a result, a signal arrives almost simultaneously at a mobile unit receiver from many directions with different transmission delays. At the UHF frequency bands usually employed for mobile radio communications, including those of cellular mobile telephone systems, significant phase differences in signals traveling on different paths may occur. The possibility for destructive summation of the signals may result, with on occasion deep fades occurring.

Terrestrial channel fading is a very strong function of the physical position of the mobile unit. A small change in position of the mobile unit changes the physical delays of all the signal propagation paths, which further results in a different phase for each path. Thus, the motion of the mobile unit through the environment can result in a quite rapid fading process. For example, in the 850 MHz cellular radio frequency band, this fading can typically be as fast as one fade per second per mile per hour of vehicle speed. Fading on this order can be extremely disruptive to signals in the terrestrial channel resulting in poor communication quality. However, additional transmitter power can be used to overcome the problem of fading.

The terrestrial cellular mobile telephone system typically requires a full-duplex channel to be provided in order to allow both directions of the telephone conversation to be simultaneously active such as provided by the conventional wired telephone system. This full-duplex radio channel is normally provided by using one frequency band for the outbound link, i.e. transmissions from the cell-site transmitter to the mobile unit receivers. A different frequency band is utilized for the inbound link, i.e. transmissions from the mobile unit transmitters to the cell-site receivers. According, this frequency band separation allows a mobile unit transmitter and receiver to be active simultaneously without feedback or interference from the transmitter into the receiver.

In the conventional cellular telephone system the available frequency band is divided into channels typically 30 KHz in bandwidth while analog FM modulation techniques are used. The system service area is divided geographically into cells of varying size. The available frequency channels are divided into sets with each set usually containing an equal number of channels. The frequency sets are assigned to cells in such a way as to minimize the possibility of co-channel interference. For example, consider a system in which there are seven frequency sets and the cells are equal size hexagons. A frequency set used in one cell will not be used in the six nearest or surrounding neighbors of that cell. Furthermore, the frequency set in one cell will not be used in the twelve next nearest neighbors of that cell.

In the conventional cellular telephone system, the handoff scheme implemented is intended to allow a call to continue when a mobile telephone crosses the boundary between two cells. The handoff from one cell to another is initiated when the cell-site receiver handling the call notices that the received signal strength from the mobile telephone falls below a predetermined threshold value. A low signal strength indication implies that the mobile telephone must be near the cell border. When the signal level falls below the predetermined threshold value, the cell-site asks the system controller to determine whether a neighboring cell-site receives the mobile telephone signal with better signal strength than the current cell-site.

The system controller in response to the current cell-site inquiry sends messages to the neighboring cell-sites with a handoff request. The cell-site neighboring the current cell-site employs special scanning receivers which look for the signal from the mobile unit on the specified channel. Should one of the neighboring cell-sites report an adequate signal level to the system controller, then a handoff will be attempted.

Handoff is then initiated when an idle channel from the channel set used in the new cell-site is selected. A control message is sent to the mobile telephone commanding it to switch from the current channel to the new channel. At the same time, the system controller switches the call from the first cell-site to the second cell-site. In the conventional system a break-before-make scheme is utilized such that no diversity reception is possible in overcoming fades.

Furthermore should the mobile telephone fail to hear the command to switch channels, the handoff will fail. Actual operating experience indicates that handoff failures occur frequently which questions the reliability of the system.

In the conventional cellular telephone system, path fading deleteriously affects communications and can cause disruption in call service. It is therefore an object of the present invention to provide, in a cellular telephone system, receiver a design which facilitates reception and processing of the strongest signals transmitted from one or more cell-sites, these signals being multipath signals from a single cell-site or signals transmitted by multiple cell-sites.

SUMMARY OF THE INVENTION

In a CDMA cellular telephone system, the same frequency band is used for communication in all cells. The CDMA waveform properties that provide processing gain are also used to discriminate between signals that occupy the same frequency band. Furthermore the high speed pseudonoise (PN) modulation allows many different production paths to be separated, provided the difference in path propagation delays exceed the pN chip duration, or one/bandwidth. If a PN chip rate of 1 MHz is employed in a CDMA system, the full spread spectrum processing gain, equal to the ratio of the spread bandwidth to system data rate, can be employed against paths that differ by more than one microsecond in path delay from the desired path. A one microsecond path delay differential corresponds to differential path distance of 1,000 feet. The urban environment typically provides differential path delays in excess of one microsecond, and up to 10-20 microseconds are reported in some areas.

In narrow band modulation systems such as the analog FM modulation employed by conventional telephone systems, the existence of multiple paths results in severe multipath fading. With wideband CDMA modulation, however, the different paths may be discriminated against in the demodulation process. This discrimination greatly reduces the severity of multipath fading. Multipath fading is not totally eliminated in using CDMA discrimination techniques because there will occasionally exist paths with delay differentials of less than the minimum path delay for the particular system. Signals having path delays on this order cannot be discriminated against in the demodulator. It is therefor desirable that the system should provide diversity to further reduce the effects of fading.

The deleterious effects of fading can be controlled somewhat by controlling transmitter power in the CDMA system. A system for cell-site and mobile unit power control is disclosed in copending U.S. Patent Application entitled "METHOD AND APPARATUS FOR CONTROLLING TRANSMISSION POWER IN A CDMA CELLULAR MOBILE TELEPHONE SYSTEM", Ser. No. 07/433,031, filed Nov. 7, 1989, by the inventors hereof and assigned to the Assignee of the present invention. Furthermore the effect of multipath fading can be reduced in the handoff mode when the mobile unit is transitioning between cell-site service area with the mobile unit communicating cell-sites during the handoff process. The handoff scheme is disclosed in copending U.S. Patent Application entitled "SOFT HANDOFF IN A CDMA CELLULAR TELEPHONE SYSTEM", Ser. No. 07/433,030, filed Nov. 7, 1989, by the inventors hereof and assigned to the Assignee of the present invention.

The existence of multipaths can provide path diversity to a wideband PN CDMA system. If two or more paths are available with greater than one microsecond differential path delay, two or more PN receivers can be employed to separately receive these signals. Since these signals will typically exhibit independence in multipath fading, i.e., they usually do not fade together, the outputs of the two receivers can be diversity combined. Therefore a loss in performance only occurs when both receivers experience fades at the same time. Hence, one aspect of the present invention is the provision of two or more PN receivers in combination with a diversity combiner.

Another aspect of the present invention is that as a mobile unit moves through the physical environment, the number of multiple paths and their signals strengths constantly vary. The present invention therefore utilizes a special receiver, called a searcher receiver, which constantly scans the time domain of the channel to determine the existence, the location in the time domain, and the relative signal strengths of signals in the multiple path environment. The searcher receiver provides control over the data receivers in tracking the best signals available on differing paths.

In a CDMA cellular telephone system, each cell-site has a plurality of modulator-demodulator units or spread spectrum modems. Each modem consists of a digital spread spectrum transmit modulator, at least one digital spread spectrum data receiver and a searcher receiver. Each modem at the cell-site is assigned to a mobile unit as needed to facilitate communications with the assigned mobile unit. Therefore in many instances many modems are available for use while other ones may be active in communicating with respective mobile units. A soft handoff scheme is employed for a CDMA cellular telephone system in which a new cell-site modem is assigned to a mobile unit while the old cell-site continues to service the call. When the mobile unit is located in the transition region between the two cell-sites, the call can be switched back and forth between cell-sites as signal strength dictates. Since the mobile unit is always communicating through at least one cell-site, no disrupting effects to the mobile unit or in service will occur. The present invention utilizes multiple receivers at the mobile unit which are also used in a diversity function when in the handoff process or firmly in a single cell.

In the CDMA cellular telephone system, each cell-site transmits a "pilot carrier" signal. This pilot signal is used by the mobile units to obtain initial system synchronization and to provide robust time, frequency and phase tracking of the cell-site transmitted signals.

Each cell-site also transmits a "setup" channel comprised of spread spectrum modulated information, such as cell-site identification, system timing, mobile paging information and various other control signals. The pilot signal transmitted by each cell-site is of the same spreading code but with a different code phase offset. Phase offset allows the pilot signals to be distinguished from one another resulting in distinguishment between cell-sites from which they originate. Use of the same pilot signal code allows the mobile unit to find system timing synchronization by a single search through all pilot signal code phases. The strongest pilot signal, as determined by a correlation process for each code phase, is readily identifiable. The identified pilot signal corresponds to the pilot signal transmitted by the nearest cell-site.

Upon acquisition of the strongest pilot signal, i.e. initial synchronization of the mobile unit with the strongest pilot signal, the mobile unit searches for the appropriate setup channel of that cell-site. The setup channel is transmitted by the cell-site using one of a plurality of different predetermined spread spectrum codes. In an exemplary embodiment of the present invention, twenty-one different codes are used. However, it should be understood that more or less codes could be used in the setup channel as determined by system parameters. The mobile unit then begins a search through all of the different codes used in the setup channel.

When the mobile unit identifies the appropriate setup code for that cell-site, system information is received and processed. The mobile unit further monitors the setup channel for control messages. One such control message would indicate a call is waiting for transfer to this mobile unit.

The mobile unit continues to scan the received pilot carrier signal code at the code offsets corresponding to neighboring cell-site transmitted pilot signals. This scanning is done in order to determine if the pilot signal emanating from neighboring cells is becoming stronger than the pilot signal first determined to be strongest. If, while in this call inactive mode, a neighbor cell-site pilot signal becomes stronger than that of the initial cell-site transmitted pilot signal, the mobile unit will acquire the stronger pilot signals and corresponding setup channel of the new cell-site.

When a call is initiated, a pseudonoise (PN) code address is determined for use during the course of this call. The code address may be either assigned by the cell-site or be determined by prearrangement based upon the identity of the mobile unit. After a call is initiated the mobile unit continues to scan the pilot signal transmitted by cell-sites located in neighboring cells. Pilot signal scanning continues in order to determine if one of the neighboring cell-site transmitted pilot signals becomes stronger than the pilot signal transmitted by the cell-site the mobile unit is in communication with. When the pilot signal transmitted by a cell-site located in a neighboring cell becomes stronger than the pilot signal transmitted by a cell-site in the current cell, it is an indication to the mobile unit that a new cell has been entered and that a handoff should be initiated. In response to this pilot signal strength determination, the mobile unit generates and transmits a control message to the cell-site presently servicing the call. This control message, indicative that a new cell-site transmitted pilot signal is now stronger than the current cell-site transmitted pilot signal, is provided to the system controller. The control message further contains information identifying the new cell-site and PN code. The control message as relayed to the system controller is interpreted that a handoff in mobile unit communications to the identified new cell-site is to begin.

The system controller now begins the handoff process. It should be understood that during handoff the PN code address of the particular mobile unit which is to undergo the handoff process need not change. The system controller begins the handoff by assigning a modem located in the new cell-site to the call. This modem is given the PN address associated with the call in communications between the mobile unit and the current cell-site modem. The new cell-site modem assigned to service the call searches for and finds the mobile unit transmitted signal. The cell-site modem also begins transmitting an outbound signal to the mobile unit. The mobile unit searches for this outbound signals in accordance with the signal and setup channel information provided by the new cell-site. When the new cell-site modem transmitted signal is acquired, the mobile unit switches over to listening to this signal. The mobile unit then transmits a control message indicating that handoff is complete. The control message is provided by either or both of the old and new cell-site modems to the system controller. In response to this control message the system controller switches the call over to the new cell-site modem alone while discontinuing the call through the old cell-site modem. The old cell-site modem then enters a pool of idle modems available for reassignment.

However, when the mobile unit is within a single cell service area, in which the cell-site signals are multipath signals, the corresponding cell-site transmitted signals are stronger than any other cell-site transmitted signals which may be received at the mobile unit. In the single cell mode of operation, the searcher receiver monitors the multipath signals and identifies the strongest as received on the various multipaths. The searcher receiver provides this information to the mobile unit control processor which instructs the data receivers to track the signals upon these strongest paths. The signals are then output from the data receivers where they are provided to a diversity combiner.

During call handoff, mobile unit communications with the various cell-sites is subject to path diversity. These communications are also processed by the multiple receivers at the mobile unit for diversity combination. Furthermore the signals transmitted through the various cell-sites are combined in a diversity combiner at the system controller. The present invention further permits what is referred to herein as the cell-site diversity mode at times other than a handoff. In this mode the mobile unit is permitted to communicate with various cell-sites on an ongoing basis.

In the cell-site diversity mode the call is allowed to linger in the in-between state as described above with reference to the call being processed by two cell-sites. In the exemplary embodiment described herein with reference to the mobile telephone of the present invention, a total of three demodulator processors or receivers are utilized. One of the receivers is used for the scanning function, while the two other receivers are used as a two channel diversity receiver. During operation in a single cell, the scanning receiver attempts to find the cell-site transmitted signal travelling upon multiple paths to the mobile unit. These multipath signals are typically caused by reflections of the signals by the terrain buildings and other signals obstructions. When two or more such reflections are found, the two receivers are assigned to the two strongest paths. The scanning receiver continues to evaluate the multiple paths to keep the two receivers synchronized with signals on the two strongest paths as path conditions change.

In the cell-site diversity mode, the strongest paths from each cell-site is determined by the search receiver. The two receivers are assigned to demodulate the signals on the strongest two paths of the paths available from the original cell-site and from the new cell-site. The data demodulation process uses information from both of these receivers in a diversity combining operation. The result of this diversity combining operation is a greatly improved resistance to deleterious fading that may occur in the multipath cellular telephone environment.

The present invention uses diversity combining to significantly advance the quality and reliability of communications in a mobile cellular telephone system. In the present invention a form of maximal ratio combining is utilized. The signal-to-noise ratio is determined for both paths being combined with the contributions from the two paths weighted accordingly. Combining is coherent since pilot signal demodulation allows the phase of each path to be determined.

In the path from the mobile unit to the two cell-sites, path diversity reception is also obtained by having both cell-sites demodulate the mobile unit transmitted signals. Both cell-sites forward their demodulated data signals to the system controller along with an indication of signal quality in the cell-sites receiver. The system controller then combines the two versions of the mobile unit signal and selects the signal with the best quality indication. It should be understood that it is possible to transmit the undecoded or even the undemodulated signals to the system controller in order to allow a better diversity combining process to be utilized.

The system controller responds by connecting the call to a modem in the new cell-site. The system controller then performs diversity combining of the signals received by the two cell-sites while the mobile unit performs diversity combining of the signals received from the two cell-sites. The cell diversity mode continues as long as signals received from both cell-sites are of a level sufficient to permit good quality demodulation.

The mobile unit continues to search for signals transmitted from other cell-sites. If a third cell-site transmitted signal becomes stronger than one of the original two cell-site signals, the control message is then transmitted by the mobile unit via at least one current cell-site to the system controller. The control message indicates the identity of this cell-site and a request for handoff. The system controller then discontinues the call being communicated via the weakest cell-site signal of the three while providing the call through the two strongest cell-sites. Should the mobile units be equipped with additional receivers, such as three receivers, a triple cell-site diversity mode may be implemented.

The cell-site diversity mode is terminated when the mobile unit determines that only one cell-site is providing adequate signals for quality demodulation. The mobile unit then sends a control message indicative of the cell-site to remain in communication upon termination of the cell-site diversity mode. The cell-site diversity mode may also be terminated by the system controller if the system were to become overloaded with an insufficient number of modems available to support all mobile unit requests for this mode of operation. The cell-site diversity mode as discussed is implemented by decisions being made at the mobile unit to operate in the cell-site diversity mode. However, it should be understood that the cell-site diversity mode can be implemented with the decisions for operation in this mode being made at the system controller. It should also be understood that the cell-site receiver can employ the above described multiple receiver architecture to provide diversity reception when signals arrive at the cell-site from a mobile unit after travelling over paths with greater than one PN chip differential delay.

The present invention provides a substantial improvement over conventional cellular telephone systems with respect to resistance to signal fades by coherently combining multipath signals.

BRIEF DESCRIPTION OF THE DRAWINGS

The features and advantages of the present invention will become more apparent from the detailed description set forth below when taken in conjunction with the drawings in which like reference characters correspond throughout and wherein.

DETAILED DESCRIPTION OF THE PREFERRED EMBODIMENTS

Figure 1:
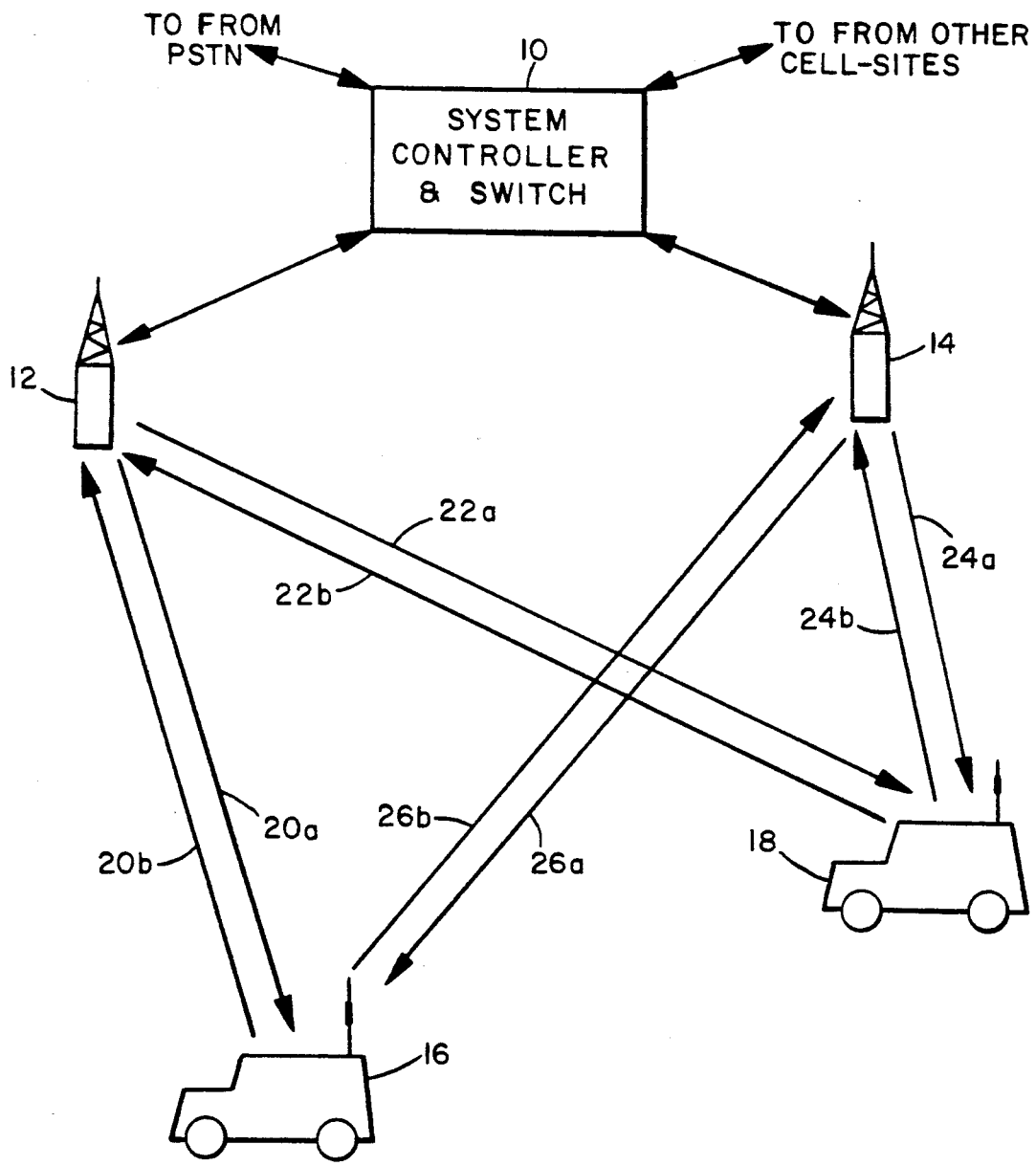
FIG. 1 is a schematic overview of an exemplary CDMA cellular telephone system in accordance with the present invention.

An exemplary telephone system in which the present invention is embodied is illustrated in FIG. 1. The system illustrated in FIG. 1 utilizes CDMA modulation techniques in communication between the system mobile units or mobile telephones, and the cell-sites. Cellular systems in large cities may have hundreds of cell-site stations serving hundreds of thousands of mobile telephones. The use of CDMA techniques readily facilitates increases in user capacity in systems of this size as compared to conventional FM modulation cellular systems.

In FIG. 1, system controller and switch 10, also referred to as mobile telephone switching office (MTSO), typically includes interface and processing circuitry for providing system control to the cell-sites. Controller 10 controls the routing of telephone calls from the public switched telephone network (PSTN) to the appropriate cell-site for transmission to the appropriate mobile unit. Controller 10 also controls the routing of calls from the mobile units, via at least one cell-site to the PSTN. Controller 10 may direct calls between mobile users via the appropriate cell-site stations since such mobile units do not typically communicate directly with one another.

Controller 10 may be coupled to the cell-sites by various means such as dedicated telephone lines, optical fiber links or by microwave communication links. In FIG. 1, two such exemplary cell-sites 12 and 14, along with mobile units 16 and 18 each including a cellular telephone are illustrated. Arrows 20a–20b and 22a–22b respectively define the possible communication links between cell-site 12 and mobile units 16 and 18. Similarly, arrows 24a–24b and arrows 26a–26b respectively define the possible communication links between cell-site 14 and mobile units 16 and 18. Cell-sites 12 and 14 nominally transmit using equal power.

The cell-site service areas or cells are designed in geographic shapes such that the mobile unit will normally be closest to one cell-site. When the mobile unit is idle, i.e. no calls in progress, the mobile unit constantly monitors the pilot signal transmissions from each nearby cell-site. As illustrated in FIG. 1, the pilot signals are respectively transmitted to mobile unit 16 by cell-sites 12 and 14 upon communication links 20a and 26a. The mobile unit then determines which cell it is in by comparing signal strength of pilot signals transmitted from these particular cell-sites.

Mobile unit 16 measures the total received power in pilot signals transmitted by cell-sites 12 and 14 upon path 20a and 26a. Similarly, mobile unit 18 measures the total received power in pilot signals as transmitted by cell-sites 12 and 14 upon paths 22a and 24a. In each of mobile units 16 and 18, pilot signal power is measured in the receiver where the signal is a wideband signal. Accordingly, this power measurement is made prior to correlation of the received signal with a pseudonoise (PN) spectrum spreading signal.

When mobile unit 16 is closer to cell-site 12, the received signal power will be dominated by the signal traveling path 20a. When mobile unit 16 is nearer to cell-site 14, the received power will be dominated by the signal traveling on path 26a. Similarly, when mobile unit 18 is closer to cell-site 14, the received power will be dominated by the signal on path 24a. When mobile unit 18 is closer to cell-site 12, the received power will be dominated by the signal traveling on path 22a.

Each of mobile units 16 and 18 use the resultant measurement, together with knowledge of the cell-site transmitter power and the mobile unit antenna gain, in estimating the path loss to the closest cell-site. The estimated path loss, together with knowledge of the mobile antenna gain and the cell-site G/T (receive antenna gain G divided by receiver noise level T) is used to determine the nominal transmitter power required to obtain the desired carrier-to-noise ratio in the cell-site receiver. The knowledge by the mobile units of the cell-site parameters may be either fixed in memory or transmitted in cell-site information broadcast signals, setup channel, to indicate other than nominal conditions for a particular cell-site.

In the example illustrated in FIG. 1, mobile unit 16 may be considered closest to cell-site 12. When mobile unit 16 initiates a call, a control message is transmitted to the nearest cell-site, cell-site 12. Cell-site 12 upon receiving the call request message, signals system controller 10 and transfers the call number. System controller 10 then connects the call through the PSTN to the intended recipient.

Should a call be initiated within the PSTN, controller 10 transmits the call information to all the cell-sites in the area. The cell-sites in return transmit a paging message to the intended recipient mobile unit. When the mobile unit hears a paging message, it responds with a control message that is transmitted to the nearest cell-site. This control message signals the system controller that this particular cell-site is in communication with the mobile unit. Controller 10 then routes the call through this cell-site to the mobile unit.

Should mobile unit 16 move out of the coverage area of the initial cell-site, cell-site 12, an attempt is made to continue the call by routing the call through another cell-site. In the handoff process there are two different methods of initiating the handoff of the call or routing through another cell-site.

The first method, called the cell-site initiated message, is similar to the handoff method employed in the original first generation analog cellular telephone systems currently in use. In the cell-site initiated method, the initial cell-site, cell-site 12, notices that the signal transmitted by mobile unit 16 has fallen below a certain threshold level. Cell-site 12 then transmits a handoff request to system controller 10. Controller 10 relays the request to all neighboring cell-sites, including cell-site 14. The controller transmitted request includes information relating to the channel, including the PN code sequence used by mobile unit 16. Cell-site 14 tunes a receiver to the channel being used by the mobile unit and measure the signal strength, typically using digital techniques. If cell-site 14 receivers report a stronger signal than the initial cell-site reported signal strength, then a handoff is made to this cell-site.

The second method of initiating a handoff is called the mobile initiated handoff. The mobile unit is equipped with a search receiver which is used to scan the pilot signal transmission of neighboring cell-sites, in addition to performing other functions. If a pilot signal of cell-site 14 is found to be stronger than the pilot signal of cell-site 12, mobile unit 16 transmits a control message to the current cell-site, cell-site 12. This control message contains information identifying the cell-site of greater signal strength in addition to information requesting a handoff of this cell-site. Cell-site 16 transfers this control message to controller 10.

The mobile initiated handoff method has various advantages over the cell-site initiated handoff method. The mobile unit becomes aware of changes in paths between itself and the various neighboring cell-sites much sooner and with less effort than the cell-sites are capable of doing. However, to perform a mobile initiated handoff, each mobile unit must be provided with a searching receiver to perform the scan function. In the exemplary embodiment described herein of a mobile unit with CDMA communications capability, the search receiver has additional functions which require its presence.

When mobile unit 16 is within the coverage area of cell-site 14, such that the transmitted signals of cell-site 14 are the strongest, mobile unit 16 searcher receiver utilizes multipath signals of strongest strength for processing in the multiple data receivers.

Should mobile unit 16 move out of the coverage area of the initial cell-site, cell-site 12, an attempt is made to continue the call by routing the call through another cell-site. In the cell diversity mode the call is routed through multiple cell-sites. The use of the diversity receiver system of the present invention enables communications between mobile unit 16 and cell-sites 12, 14 and various other cell-sites.

Figure 2:
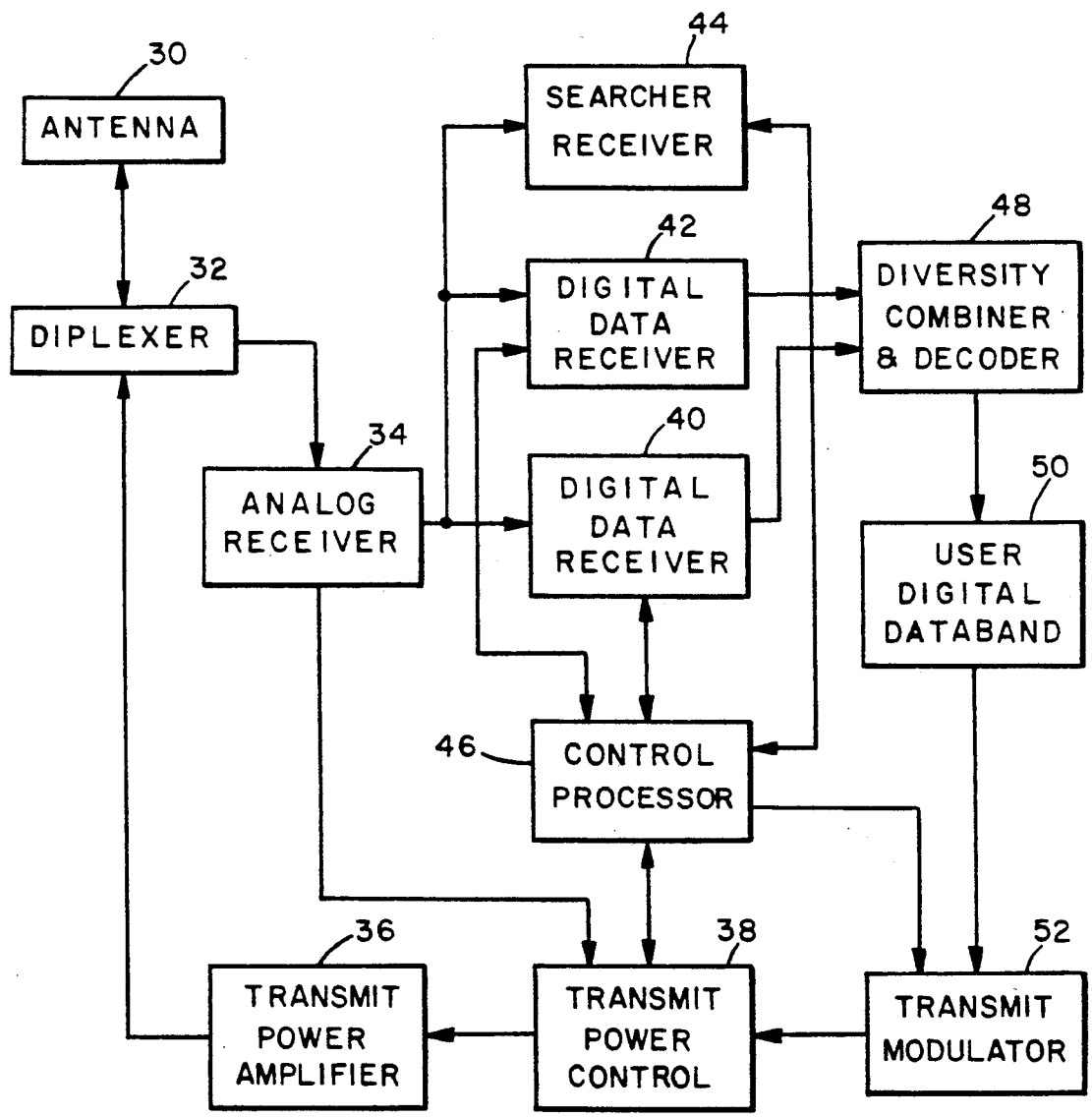
FIG. 2 is a block diagram of a mobile unit telephone configured for CDMA communications in a CDMA cellular telephone system.

FIG. 2 illustrates in block diagram form the mobile unit. The mobile unit includes an antenna 30 which is coupled through diplexer 32 to analog receiver 34 and transmit power amplifier 36. Antenna 30 and diplexer 32 are of standard design and permit simultaneous transmission and reception through a single antenna. Antenna 30 collects transmitted signals and provides them through diplexer 32 to analog receiver 34. Receiver 34 receives the RF frequency signals from diplexer 32 which are typically in the 850 MHz frequency band for amplification and frequency downconversion to an IF frequency. This translation process is accomplished using a frequency synthesizer of standard design which permits the receiver to be tuned to any of the frequencies within the receive frequency band of the overall cellular telephone frequency band.

The IF signal is then passed through a surface acoustic wave (SAW) bandpass filter which in the preferred embodiment is approximately 1.25 MHz in bandwidth. The characteristics of the SAW filter are chosen to match the waveform of the signal transmitted by the cell-site which has been direct sequence spread spectrum modulated by a PN sequence clocked at a predetermined rate, which in the preferred embodiment is 1.25 MHz. This clock rate is chosen to be an integer multiple of a number of common data rates such as 16 Kbps, 9.6 Kbps, and 4.8 Kbps.

Receiver 34 also performs a power control function for adjusting the transmit power of the mobile unit. Receiver 34 generates an analog power control signal that is provided to transmit power control circuitry 38.

Receiver 34 is also provided with an analog to digital (A/D) converter (not shown) for converting the IF signal to a digital signal with conversion occurring at a 9.216 MHz clock rate in the preferred embodiment which is exactly eight times the PN chip rate. The digitized signal is provided to each of two or more signal processors or data receivers, one of which is a searcher receiver with the remainder being data receivers.

In FIG. 2, the digitized signal output from receiver 34 is provided to digital data receivers 40 and 42 and to searcher receiver 44. It should be understood that an inexpensive, low performance mobile unit might have only a single data receiver while higher performance units may have two or more to allow diversity reception.

The digitized IF signal may contain the signals of many on-going calls together with the pilot carriers transmitted by the current and all neighboring cell-sites. The function of the receivers 40 and 42 are to correlate the IF samples with the proper PN sequence. This correlation process provides a property that is well-known in the art as "processing gain" which enhances the signal-to-interference ratio of a signal matching the proper PN sequence while not enhancing other signals. Correlation output is then synchronously detected using the pilot carrier from the closest cell-site as a carrier phase reference. The result of this detection process is a sequence of encoded data symbols.

A property of the PN sequence as used in the present invention is that discrimination is provided against multi-path signals When the signal arrives at the mobile receiver after passing through more than one path, there will be a difference in the reception time of the signals. This reception time difference corresponds to the difference in distance divided by the speed of light. If this time difference exceeds one microsecond, then the correlation process will discriminate against one of the paths. The receiver can choose whether to track and receive the earlier or later path. If two receivers are provided, such as receivers 40 and 42, then two independent paths can be tracked and in parallel.

Searcher receiver 44, under control of control processor 46 is for continuously scanning the time domain around the nominal time of a received pilot signal of the cell-site for other multipath pilot signals from the same cell-site and for other cell-site transmitted pilot signals. Receiver 44 will measure the strength of any reception of a desired waveform at times other than the nominal time. Receiver 44 compares signal strength in the received signals. Receiver 44 provides a signal strength signal to control processor 46 indicative of the strongest signals and relative time relationship.

Processor 46 provides signals to control digital data receivers 40 and 42 for each to process a different one of the strongest signals. On occasion another cell-site transmitted pilot signal is of greater signal strength than the current cell-site signal strength. Control processor 46 then would generate a control message for transmission to the system controller via the current cell-site requesting a transfer of the call to the cell-site corresponding to the stronger pilot signal. Receivers 40 and 42 may therefor handle calls through two different cell-sites.

The outputs of receivers 40 and 42 are provided to diversity combiner and decoder circuitry 48. The diversity combiner circuitry contained within circuitry 48 simply adjusts the timing of the two streams of received signals into alignment and adds them together. This addition process may be proceeded by multiplying the two streams by a number corresponding to the relative signal strengths of the two streams. This operation can be considered a maximal ratio diversity combiner. The resulting combined signal stream is then decoded using a forward stream error detection decoder also contained within circuitry 48.

In the exemplary embodiment convolutional encoding is utilized. The convolutional encoding has a constraint length 9 and a code rate $\frac{1}{3}$, i.e. three encoded symbols are produced and transmitted for every information bit to be transmitted. The optimum decoder for this type of code is of the soft decision Viterbi algorithm decoder design. The resulting decoded information bits are passed to the user digital baseband circuitry 50.

Baseband circuitry 50 typically includes a digital vocoder (not shown). Baseband circuitry 50 further serves as an interface with a handset or any other type of peripheral device. Baseband circuitry 50 accommodates a variety of different vocoder designs. Baseband circuitry 50 provides output information signals to the user in accordance with the information provided thereto from circuitry 48.

User analog voice signals typically provided through a handset are provided as an input to baseband circuitry 50. Baseband circuitry 50 includes an analog to digital (A/D) converter (not shown) which converts the analog signal to digital form. The digital signal is provided to the digital vocoder where it is encoded. The vocoder output is provided to a forward error correction encoding circuit (not shown) for error correction. This voice encoded digitized voice signal is output from baseband circuitry 50 to transmit modulator 52.

Transmit modulator 52 modulates the encoded signal on a PN carrier signal whose PN sequence is chosen according to the assigned address function for the call. The PN sequence is determined by control processor 46 from call setup information that is transmitted by the cell-site and decoded by receivers 40 and 42. In the alternative, control processor 46 may determine the PN sequence through pre-arrangement with the cell-site. Control processor 46 provides the PN sequence information to transmit modulator 52 and to receivers 40 and 42 for call decoding. The output of transmit modulator 52 is provided to transmit power control circuitry 38. Signal transmission power is controlled by the analog power control signal provided from receiver 34. Control bits are transmitted by the cell-sites in the form power adjustment command and are processed by data receivers 40 and 42. The power adjustment command is used by control processor 46 in setting the power level in mobile unit transmission. In response to this command, control processor 46 generates a digital power control signal that is provided to circuitry 38. Further information on the interrelationship of the receivers 40 and 42, control processor 46 and transmit power control circuitry 38 are also further described in the above-mentioned copending patent application.

Transmit power control circuitry 38 outputs the power controlled modulated signal to transmit power amplifier circuitry 36. Circuitry 36 amplifies and converts the IF signal to an RF frequency by mixing with a frequency synthesizer output signal which tunes the signal to the proper output frequency. Circuitry 36 includes an amplifier which amplifies the power to a final output level. The intended transmission signal is output from circuitry 36 to diplexer 32. Diplexer 32 couples the signal to antenna 30 for transmission to the cell-sites.

Control processor 46 also is capable of generating control messages such as cell-diversity mode requests and cell-site communication termination commands. These commands are provided to transmit modulator 52 for transmission. Control processor 46 is responsive to the data received from data receivers 40, 42 and search receiver 44 for making decisions relative to handoff and diversity combining.

Figure 3:
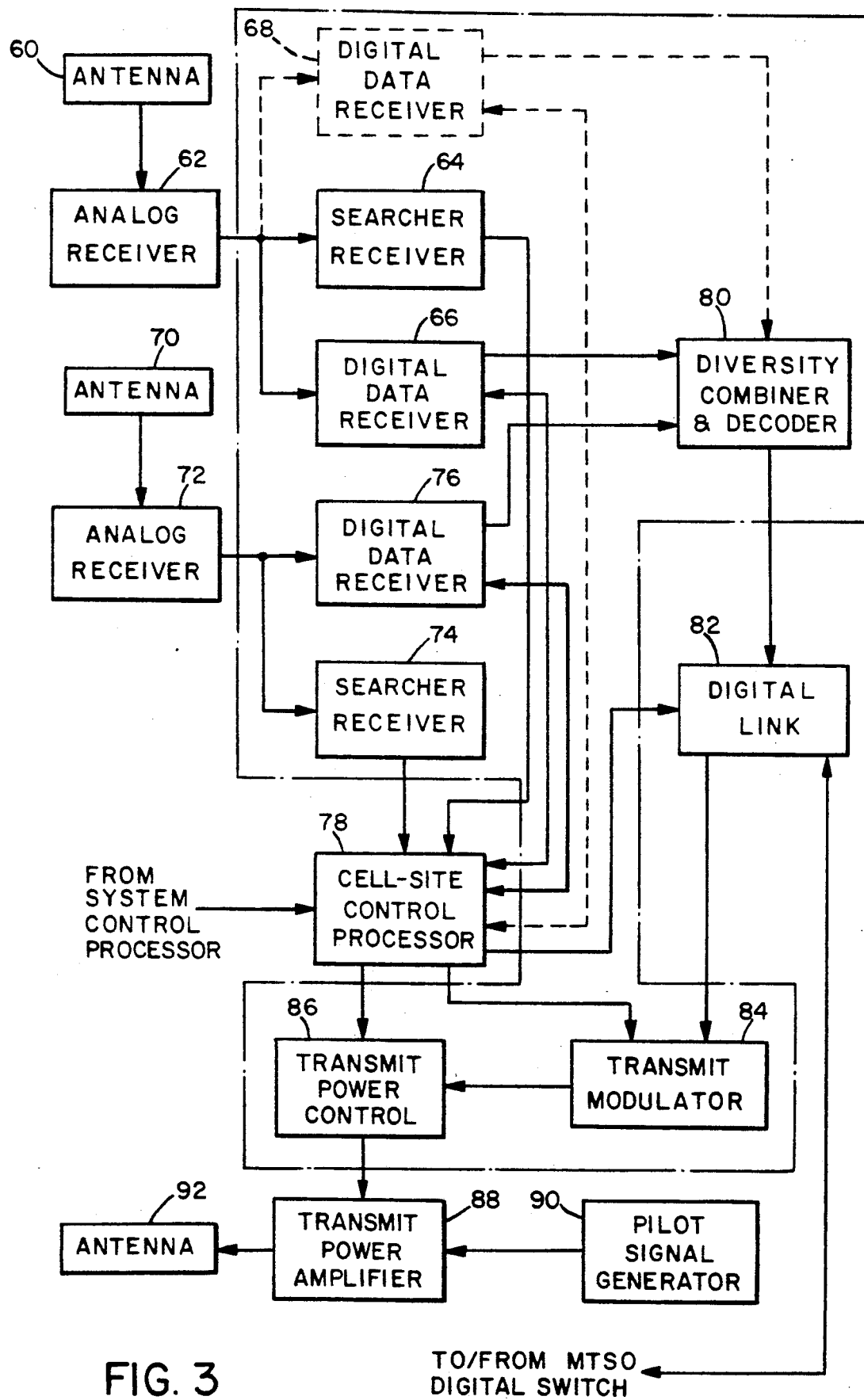
FIG. 3 is a block diagram of a cell-site equipment in a CDMA cellular telephone system.

FIG. 3 illustrates in block diagram form an exemplary embodiment of the cell-site equipment. At the cell-site, two receiver systems are utilized with each having a separate antenna and analog receiver for space diversity reception. In each of the receiver systems the signals are processed identically until the signals undergo a diversity combination process. The elements within the dashed lines correspond to elements corresponding to the communications between the cell-site and one mobile unit. The output of the analog receivers are also provided to other elements used in communications with other mobile units.

In FIG. 3, the first receiver system is comprised of antenna 60, analog receiver 62, searcher receiver 64 and digital data receiver 66. This receiver system may also include an optional digital data receiver 68. The second receiver system includes antenna 70, analog receiver 72, searcher receiver 64 and digital data receiver 66. Also utilized in signal processing and control for handoff and diversity is cell-site control processor 78. Both receiver systems are coupled to diversity combiner and decoder circuitry 80. Digital link 82 is utilized to communicate signals to and from the MTSO (FIG. 4) with cell-site transmit modulator 84 and circuitry 80 under the control of control processor 78.

Signals received on antenna 60 are provided to analog receiver 62. Received signals amplified by an amplifier in receiver 62 and translated to an IF frequency by mixing with a frequency synthesizer output signal. The IF signals are bandpass filtered and digitized in a process identical to that described with reference to the mobile unit analog receiver. The digitized IF signals are provided to digital data receiver 66, optional data receiver 68 and searcher receiver 64 and are processed respectively in a manner similar to that as disclosed with reference to the digital data receivers and searcher receiver of the mobile unit in FIG. 2. However, the processing by the digital data receivers and the searcher receivers are different for the mobile to cell-site link from that used in the cell-site to mobile link in several respects.

In the inbound, or mobile unit to cell-site link, the mobile unit does not transmit a pilot signal that can be used for coherent reference purposes in signal processing at the cell-site. Thus, the mobile unit to cell-site link utilizes a non-coherent modulation and demodulation scheme using 64-ary orthogonal signalling.

Searcher receiver 64 is again used to scan the time domain about the received signal to ensure that the associated digital data receiver 66, and data receiver 68 if used, are tracking and processing the strongest available, i.e. received time domain signal. This tracking process is identical to that described with reference to the mobile unit. Searcher receiver 64 provides a signal to cell-site control processor 78 which provides control signals to digital data receivers 66 and 68 for selecting the appropriate received signal for processing.

In the 64-ary orthogonal signalling process, the mobile unit transmitted symbols has one of 64 different possibilities. A 6 bit symbol is encoded into one of $2^6$, i.e. 64, different binary sequences. The set of sequences chosen are known as Walsh functions. The optimum receive function for the Walsh function is the Fast Hadamard Transform (FHT). In searcher receiver 64 and digital data receivers 66 and 68, the input signal is correlated as discussed with reference to the mobile unit receivers, with the correlator output fed to a FHT processor. The FHT processor produces a set of 64 coefficients for every 6 symbols. The 64 symbols are then multiplied by a weighting function generated in the receiver. The weighting function is linked to measured signal strength. The weighted data is then provided as an output to diversity combiner and decoder circuitry 80.

The second receiver system processes the received signals in a manner similar to that discussed with respect to the first receiver system of FIG. 3. The weighted 64 symbols output from receivers 66 and 76 are provided to diversity combiner and decoder circuitry 80. Circuitry 80 includes an adder which adds the weighted 64 symbols from receiver 66 to the weighted 64 symbols from receiver 76. The resulting 64 coefficients are compared with one another in order to determine the largest coefficient. The magnitude of the comparison result, together with the identity of the largest of the 64 coefficients, is used to determine a set of decoder weights and symbols for use within a Viterbi algorithm decoder implemented in circuitry 80.

The Viterbi decoder is preferably of a constraint length 9, and of a code rate ⅓. The Viterbi decoder is utilized to determine the most likely information bit sequence. For each vocoder data block, nominally 15 msec. of data, a signal quality estimate is obtained and transmitted as a mobile unit power adjustment command along with data to the mobile unit. Further information on the generation of this quality estimate is discussed in further detail in the co-pending application mentioned above. This quality estimate is the average signal-to-noise ratio over the 15 msec. interval.

In FIG. 3 optional digital data receiver 68 may be included for improved performance of the system. This additional data receiver alone or in combination with additional receivers can track and receive other possible delay paths of mobile unit transmitted signals. The structure and operation of this receiver is similar to that described with reference to the digital data receivers 66 and 76. Receiver 68 is utilized to obtain additional diversity modes. Optional additional digital data receivers providing additional diversity modes are extremely useful in those cell-sites which are located in dense urban areas where many possibilities for multipath signals occur.

Signals from the MTSO are coupled to the appropriate transmit modulator via digital link 82 under the control of control processor 78. Transmit modulator 84 spread spectrum modulates, according to a predetermined spreading function as assigned by control processor 78, the data for transmission to the intended recipient mobile unit. The output of transmit modulator 84 is provided to transmit power control circuitry 86 where under the control of control processor 78 the transmission power may be controlled. The output of circuitry 86 is provided to transmit power amplifier circuitry 88.

Circuitry 88 includes a summer for summing the output of transmit modulator 84 with the output of other transmit modulators at the cell-site. Circuitry 88 further includes a summer for summing the pilot signal output from pilot signal generator 90 with the summed transmit modulator output signals. Circuitry 88 also includes a digital to analog converter, frequency upconversion circuitry and an amplifier for respectfully converting a digital signal to an analog signal, converting the IF frequency signals as output from the transmit modulators to an RF frequency and amplifying to the RF signal. The output from circuitry 88 is provided to antenna 92 where it is radiated to mobile units within the cell-site service area.

Cell-site control processor 78 has the responsibility for assignment of digital data receivers and modulators to a particular call. Control processor 78 also monitors the progress of the call, quality of the signals and initiates teardown on loss of signal. The cell-site communicates with the MTSO via link 82 where it is coupled by a standard telephone wire, optical fiber, or microwave link.

Figure 4:
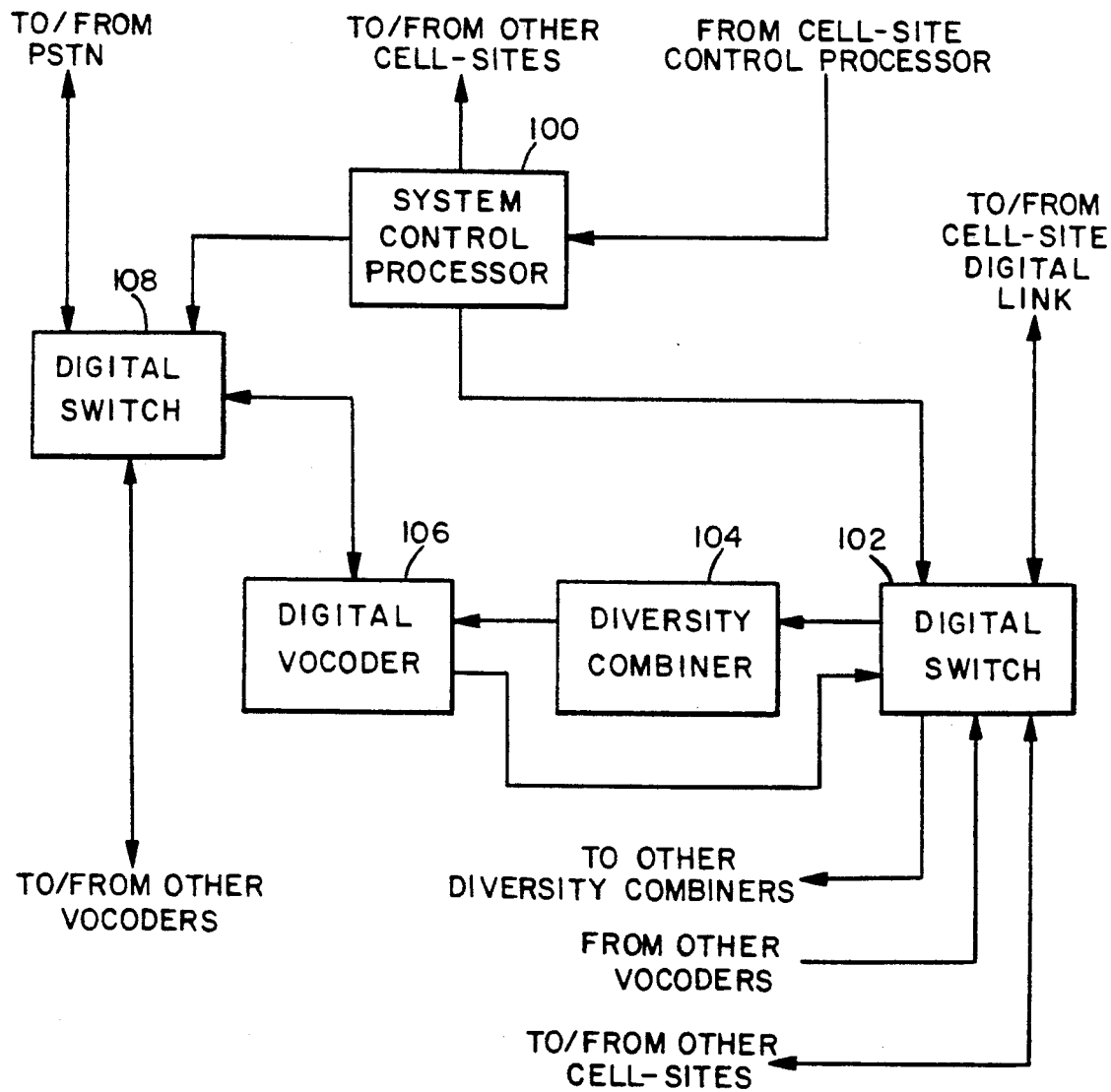
FIG. 4 is a block diagram of a mobile telephone switching office equipment.

FIG. 4 illustrates in block diagram form the equipment utilized in the MTSO. The MTSO typically includes a system controller or control processor 100, digital switch 102, diversity combiner 104, digital vocoder 106 and digital switch 108. Although not illustrated additional diversity combiners and digital vocoders are coupled between digital switches 102 and 108.

When the cell-diversity mode is active, the call is processed by two cell-sites, such that signals will arrive at the MTSO from more than one cell-site with nominally the same information. However, because of fading and interference on the inbound link from the mobile unit to the cell-sites, the signal received at one cell-site may be of better quality than the signal receive at the other cell-site.

Digital switch 102 is used in routing the information stream corresponding to a given mobile unit from one or more cell-sites to diversity combiner 104 or the corresponding diversity combiner as determined by a signal from system control processor 100. When the system is not in the cell-diversity mode, diversity combiner 104 may be either bypassed or fed the same information on each input port.

A multiplicity of serial coupled diversity combiners and vocoders are provided in parallel, nominally, one for each call to be processed. Diversity combiner 104 compares the signal quality indicators accompanying the information bits from the two or more cell-site signals. Diversity combiner 104 selects the bits corresponding to the highest quality cell-site on a frame-by-frame basis of the information for output to vocoder 106.

Vocoder 106 converts the format of the digitized voice signal to standard 64 Kbps PCM telephone format, analog, or any other standard format. The resultant signals are transmitted from vocoder 106 to digital switch 108. Under the control of system control processor 100, the call is routed to the PSTN.

Voice signals coming from the PSTN intended for the mobile unit, are provided to digital switch 108 to an appropriate digital vocoder such as vocoder 106 under control of system control processor 100. Vocoder 106 encodes the input digitized voice signals and provides the resulting information bit stream directly to digital switch 102. Digital switch 102, under the control of system control processor 100 directs the encoded data to the cell-site or cell-sites to which the mobile unit is communicating. If the mobile unit is in a handoff mode communicating to multiple cell-sites or in a cell diversity mode, digital switch 102 routes the call to the appropriate cell-sites for transmission by the appropriate cell-site transmitter to the intended recipient mobile unit. However, if the mobile unit is communicating with only a single cell-site or not in a cell diversity mode, the signal is directed only to a single cell-site.

System control processor 100 provides control over digital switches 102 and 106 for routing data to and from the MTSO. System control processor 100 also determines the assignment of calls to the cell-sites and to the vocoders at the MTSO. Furthermore, system control processor 100 communicates with each cell-site control processor about the assignment of particular calls between the MTSO and cell-site, and the assignment of PN codes for the calls. It should be further understood that as illustrated in FIG. 4 digital switches 102 and 106 are illustrated as two separate switches, however, this function may be performed by a single physical switching unit.

When the cell-diversity mode is in use, the mobile unit will use the searcher receiver to find and trap the strongest multipath signal from each of the two cell-sites. The digital data receivers will be controlled by the searcher receiver and the control processor so as to demodulate the strongest signals. When the number of receivers is less than the number of cell-sites transmitting information in parallel, a switching diversity capability is possible. For example, with only a single data receiver and with two cell-sites transmitting, the searcher will monitor the pilots from both cell-sites and choose the strongest signal for the receiver to demodulate. In this embodiment the choice can be made as frequently as every vocoder frame, or about every 15 milliseconds.

The previous description of the preferred embodiments are provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiment herein, but is to be accorded the widest scope consistent with the principles as novel features disclosed herein.

We claim:

1. A spread spectrum diversity receiver, comprising:
   searcher means for, receiving multiple pilot signals each travelling upon a different propagation path and having a resultant time difference with respect to one another, determining signal strength of each received pilot signal and corresponding time relationship with respect to one another, and providing a searcher control signal indicative of received pilot signals of greatest signal strength and corresponding time relationship; and
   data receiver means for receiving spread spectrum modulated information signals each corresponding to a different one of said pilot signals, said data receiver means responsive to said searcher control signal for demodulating one of said spread spectrum modulated information signals corresponding to one of said pilot signals of greatest signal strength and for providing an output signal bearing information.

2. The diversity receiver of claim 1 wherein said data receiver means is further responsive to said searcher control signal for demodulating at least one additional one of said spread spectrum modulated information signals each corresponding to a respective other one of said pilot signals of next to greatest signal strength, and providing corresponding additional output signals each bearing said information.

3. The diversity receiver of claim 2 further comprising combiner means for receiving and coherently combining said output signal and said additional output signals and for providing a corresponding combined output signal bearing said information.

4. The diversity receiver of claim 2 further comprising combiner means for receiving and combining said output signal and each of said additional output signal and providing a resultant combined output signal.

5. The diversity receiver of claim 4 wherein said combined output signal bears said information in an error correction coded format and further comprises decoder means for receiving and error correction decoding said combined output signal.

6. The diversity receiver of claim 1 wherein each one of said multiple pilot signals results form a single cell-site transmitted pilot signal travelling different propagation paths to reception by said searcher means, each one of said multiple pilot signals is of a same spreading code offset in time corresponding to its propagation path.

7. The diversity receiver of claim 1 wherein said multiple pilot signals result form different cell-sites each transmitting a single pilot signal spread spectrum modulated by a same spreading code with each cell-site transmitted single pilot signal travelling different propagation paths to reception by said searcher means, each cell-site transmitting its respective single pilot signal at a different code phase offset with respect to each other cell-site transmitted single pilot signal, ones of said multiple pilot signals resulting from a same cell-site transmitted single pilot signal being of a same spreading code offset in time corresponding to its propagation path.

8. In a cellular communication system in which user information signals are communicated to an intended recipient user by a cell-site using spread spectrum communication signals, wherein said cell-site transmits a spread spectrum pilot signal of a predetermined code phase, and wherein said cell-site transmitted spread spectrum communication signals and pilot signal are susceptible to multipath propagation, a recipient user spread spectrum receiver comprising:

searcher means for receiving an input signal which includes multiple path propagations of a pilot signal transmitted by a cell-site wherein each multiple path propagation pilot signal travels a different propagation path and has a corresponding path dependent offset in code phase, for scanning at different code phases so as to detect a presence of at least one of said multiple path propagation pilot signals, for measuring signal strength of each detected multiple path propagation pilot signal, for determining code phase of each detected multiple path propagation pilot signal, and for providing searcher control signals representative of multiple path propagation pilot signals of greatest signal strength and corresponding code phase; and receiver means for receiving said searcher control signals, for receiving said input signal which further includes multiple path propagations of spread spectrum communication signals transmitted by said cell-site each corresponding to a respective multiple path propagation pilot signal, for, in response to said searcher control signals, spread spectrum processing certain ones of said multiple path propagations of said spread spectrum communication signals corresponding to said multiple path propagation pilot signals of greatest signal strength so as to extract corresponding intended recipient user information signals therefrom, and for providing corresponding output signals representative of said extracted intended recipient user information signals.

9. The receiver of claim 8 wherein said receiver means comprises a plurality of data receiver means each for, receiving a different one of said searcher control signals, receiving in said input signal said multiple path propagation of spread spectrum communication signals, spread spectrum processing a different selected one of said multiple path propagations of said spread spectrum communication signals in response to said searcher control signals at a synchronization provided by a corresponding multiple path propagation pilot signal, and providing a corresponding one of said output signals.

10. The receiver of claim 8 further comprising combiner means for, receiving said output signals, coherently combining said received output signals and providing a corresponding combined output signal.

11. The receiver of claim 8 further comprising input receiver means for, receiver RF signals in a predetermined frequency band, amplifying said RF signals, frequency downconverting said amplified RF signals to an intermediate frequency range so as to produce corresponding IF signals, filtering said IF signals, digitizing said IF signals, wherein said digitized IF signals correspond to multiple path propagation of said pilot signal and corresponding multiple path propagations of said spread spectrum communication signals, and providing said IF signals to said searcher means and said receiver means as said input signal.

12. In a cellular communication system in which user information signals are communicated to an intended recipient user by at least one cell-site using spread spectrum communication signals, wherein each cell-site transmits a spread spectrum pilot signal of a same spreading code and predetermined different code phase, and wherein each cell-site transmitted spread spectrum communication signals and pilot signal are susceptible to multipath propagation, a recipient user spread spectrum receiver comprising:

searcher means for receiving an input signal including multiple path propagations of at least one pilot signal wherein each pilot signal is transmitted by a respective one of a plurality of cell-sites and wherein each multiple path propagation pilot signal travels a different propagation path and has a corresponding path dependent offset in code phase, for scanning at different code phases so as to detect a presence of at least one of said multiple path propagation pilot signals, for measuring signal strength of each detected multiple path propagation pilot signal, for determining code phase of each detected multiple path propagation pilot signal, and for providing searcher control signals representative of multiple path propagation pilot signals of greatest signal strength and corresponding code phase; and receiver means for receiving said searcher control signals, for receiving said input signal which further includes multiple path propagations of spread spectrum communication signals transmitted by at least one of said plurality of cell-sites wherein each multiple path propagation of said spread spectrum communication signals corresponds to a respective multiple path propagation pilot signal, for, in response to said searcher control signals, spread spectrum processing certain ones of said multiple path propagations of said spread spectrum communication signals corresponding to said multiple path propagation pilot signals of greatest signal strength so as to extract corresponding intended recipient user information signals therefrom, and for providing corresponding output signals representative of said extracted intended recipient user information signals.

13. The receiver of claim 12 wherein said receiver means comprises a plurality of data receiver means each for, receiving a different one of said searcher control signals, receiving in said input signal and multiple path propagations of spread spectrum communication signals, spread spectrum processing a different selected one of said multiple path propagations of said spread spectrum communication signals in response to said searcher control signals at a synchronization provided by a corresponding multiple path propagation pilot signal, and providing a corresponding one of said output signals.

14. The receiver of claim 12 further comprising combiner means for, receiving said output signals, coherently combining said received output signals and providing a corresponding combined output signal.

15. The receiver of claim 12 further comprising input receiver means for, receiving RF signals in a predetermined frequency band, amplifying said RF signals, frequency downconverting said amplified RF signals to an intermediate frequency range so as to produce corresponding IF signals, filtering said IF signals, digitizing said IF signals, wherein said digitized IF signals correspond to multiple path propagations of said pilot signal and corresponding multiple path propagations of said spread spectrum communication signals, and providing said IF signals to said searcher means and said receiver means as said input signal.

16. In a cellular communication system in which user information signals are communicated to an intended recipient user by at least one cell-site using spread spectrum communication signals, wherein each cell-site transmits a spread spectrum pilot signal of a same spreading code and predetermined different code phase, and wherein each cell-site transmitted spread spectrum communication signals and pilot signal are susceptible to multipath propagation, a method for acquiring and processing intended recipient user spread spectrum communication signals comprising the steps of:

receiving input signals including (a) multiple path propagations of at least one pilot signal wherein each pilot signal is transmitted by a respective one of a plurality of cell-site and wherein each multiple path propagation pilot signal travels a different propagation path and has a corresponding path dependent offset in code phase and (b) multiple path propagations of spread spectrum communication signals transmitted by at least one of said plurality of cell-sites wherein each multiple path propagation of said spread spectrum communication signals corresponds to a respective multiple path propagation pilot signal;

scanning said input signals at different code phases so as to detect a presence of at least one of said multiple path propagation pilot signals;

measuring signal strength of each detected multiple path propagation pilot signal;

determining code phase of each detected multiple path propagation pilot signal;

providing a searcher signal representative of multiple path propagation pilot signals of greatest signal strength and corresponding code phase;

spread spectrum processing, in response to said searcher signal, ones of said multiple path propagations of said spread spectrum communication signals corresponding to said multiple path propagation pilot signals of greatest signal strength so as to extract corresponding intended recipient user information signals therefrom; and providing corresponding output signals representative of said extracted intended recipient user information signals.

17. The method of claim 16 further comprising the steps of:

combining said output signals; and providing a corresponding combined output signal.

18. The method of claim 16 further comprising the steps of:

receiving RF signals in a predetermined frequency band;

amplifying said RF signals;

frequency downconverting said amplified RF signals to an intermediate frequency range so as to produce corresponding IF signals;

filtering said IF signals;

digitizing said IF signals; and providing said IF signals to said searcher means and said receiver means as said input signals.

* * * * *